United States Patent [19]

Ho

[11] Patent Number: 5,311,455
[45] Date of Patent: May 10, 1994

[54] PORTABLE COMPUTER HAVING A HARD DISK DRIVE MOUNTED THEREIN

[75] Inventor: Chih-Hsiang Ho, Taipei, Taiwan

[73] Assignee: Elite Computer Co., Ltd., Taipei, Taiwan

[21] Appl. No.: 977,183

[22] Filed: Nov. 16, 1992

[51] Int. Cl.⁵ .......................... H05K 5/02; G06F 1/00
[52] U.S. Cl. ................................. 364/708.1; 361/685
[58] Field of Search ...................... 364/708.1; 361/785, 361/784

[56] References Cited

U.S. PATENT DOCUMENTS

| | | | |
|---|---|---|---|
| 4,941,841 | 7/1990 | Darden et al. | 361/685 |
| 5,124,887 | 6/1992 | Kobayashi | 364/708.1 |
| 5,139,439 | 8/1992 | Shie | 364/708.1 |
| 5,159,533 | 10/1992 | Kuang | 364/708.1 |

*Primary Examiner*—David H. Malzahn
*Attorney, Agent, or Firm*—Cushman, Darby & Cushman

[57] ABSTRACT

A portable computer includes a central processing unit, a monitor unit laying on and pivoted to the central processing unit, and a hard disk drive unit fitted in the storage chamber of the central processing unit. The storage chamber has a bottom wall and a side wall assembly which has two locking holes. The hard disk drive unit includes a housing, two insertion elements mounted movably in the housing, a rotary actuating unit mounted pivotally on the central processing unit, and a spring unit which biases the insertion elements to extend from the housing to engage within the locking holes of the storage chamber so as to retain the hard disk drive unit in the storage chamber. When the rotary actuating unit is turned upward, the insertion elements retract into the housing, thereby enabling the hard disk drive unit to be removed from the central processing unit.

4 Claims, 9 Drawing Sheets

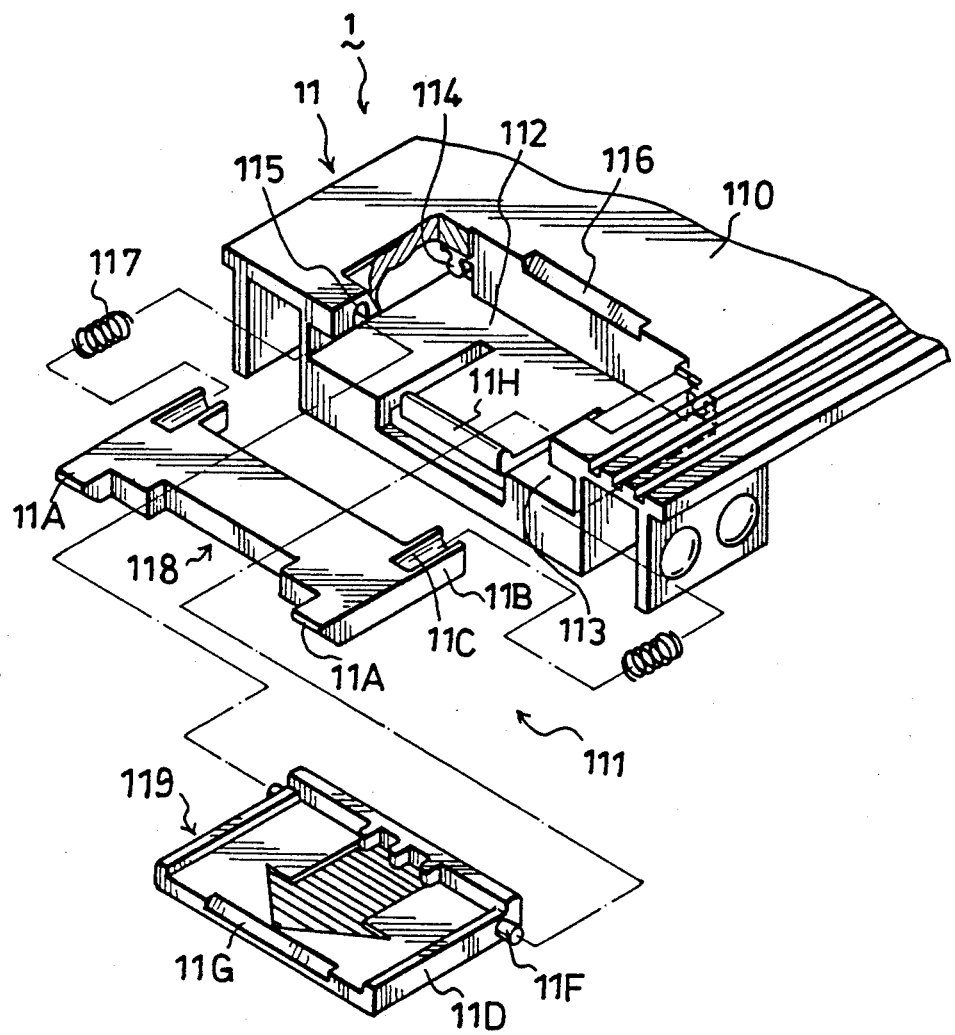
F I G. 4

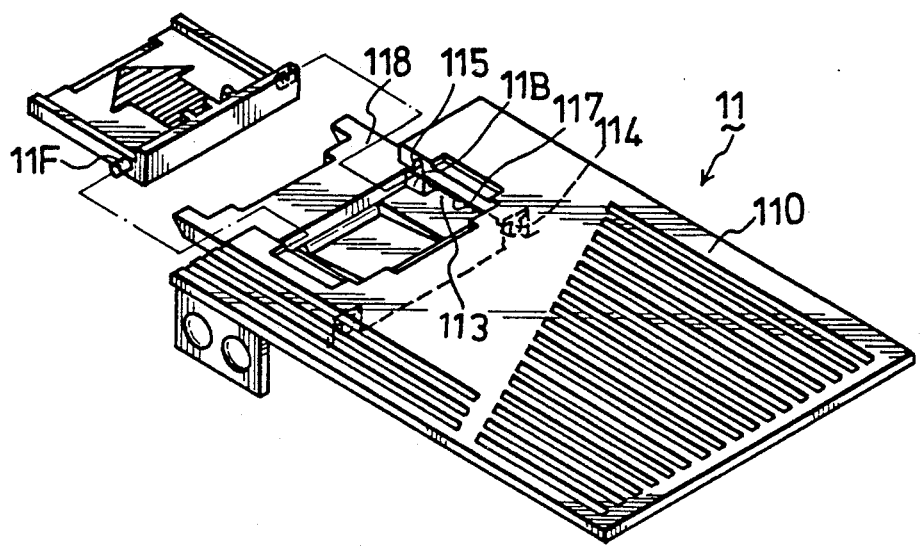
F I G. 5A
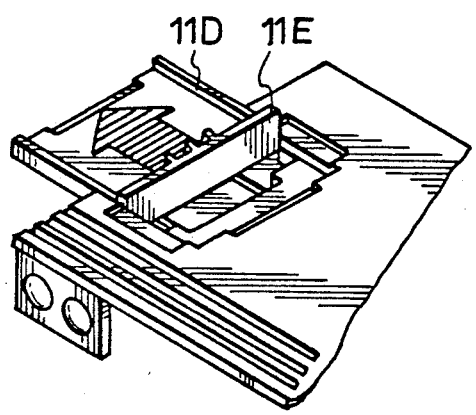
F I G. 5B

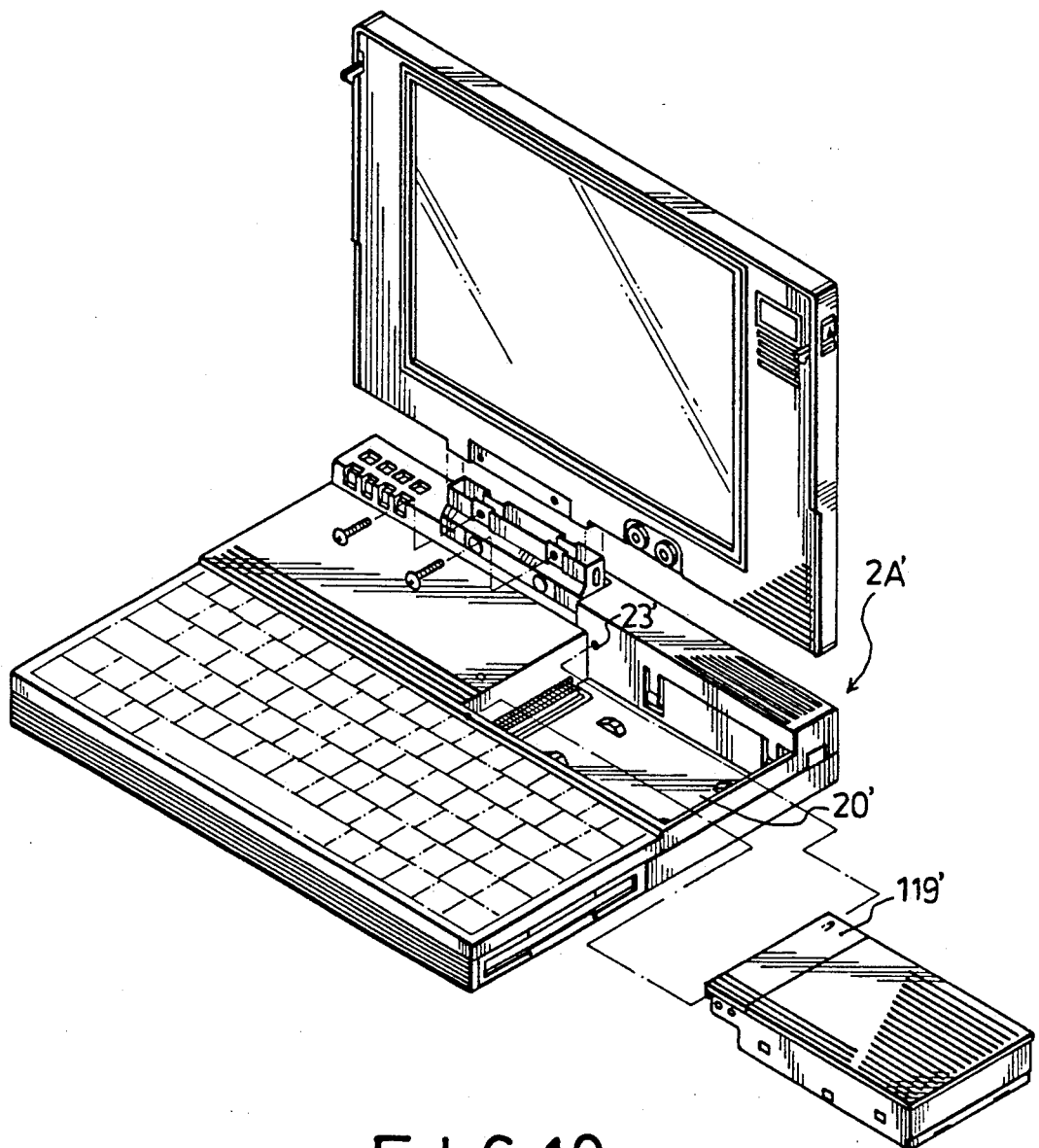
F I G. 10

5,311,455
1

PORTABLE COMPUTER HAVING A HARD DISK DRIVE MOUNTED THEREIN

BACKGROUND OF THE INVENTION

1. Field of the Invention

This invention relates to a portable computer which has a hard disk drive mounted therein, more particularly to a removable hard disk drive unit for a portable computer.

2. Description of the Related Art

Referring to FIG. 1, a conventional hard disk drive consists of a disk cartridge (3) and a housing (4). The disk cartridge (3) includes a magnetic head, a spindle motor and an actuator, which are not shown. A printed circuit (not shown) is disposed in the housing (4). The disk cartridge (3) further includes a resilient projection (30) engaged within the hole (40) of the housing (4) so as to retain the disk cartridge (3) in the housing (4) in such a manner that the connector (31) is coupled with the connector (41) of the housing (4). When the disk cartridge (3) is removed from or inserted into the housing (4), the interengaging surfaces thereof wear inevitably, thereby causing the eventual separation of the cartridge (3) from the housing (4) after a long period of usage. Furthermore, in order to withdraw the disk cartridge (3) from the housing (4), a large amount of pull force must be applied to the disk cartridge (3) so as to overcome the spring force of the resilient projection (30).

Referring to FIG. 2, another conventional hard disk drive consists of a disk cartridge (5) and a housing (6). The connector (50) of the disk cartridge (5) is coupled with the connector (60) of the housing (6). The disk cartridge (5) includes two resilient projections (51) extending from two opposite side walls thereof to engage within two retaining holes (61) of the housing (6). When the disk cartridge (5) is removed from or placed into the housing (6), the interengaging surfaces of the connectors (50, 60) easily wear. Furthermore, in order to remove the disk cartridge (5) from the housing (6), it is necessary for the operator to exert on the disk cartridge (5) a pull force which is large enough to overcome the spring force of the resilient projections (51).

Another hard disk drive unit has been screwed to a portable computer which has a central processing unit and a monitor unit laying on and mounted pivotally on the central processing unit. The screwing and unscrewing process is time-consuming, when the hard disk drive unit is removed from or placed into the portable computer.

SUMMARY OF THE INVENTION

Therefore, the main object of this invention is to provide a portable computer which has a hard disk drive unit that can be easily removed from and placed into the portable computer in a time-saving and labor-saving manner.

According to this invention, a portable computer includes a central processing unit, a monitor unit laying on and pivoted to the central processing unit, and a hard disk drive unit fitted in the storage chamber of the central processing unit. The storage chamber has a bottom wall and a side wall assembly which has two locking holes. The hard disk drive unit includes a housing, two insertion elements mounted movably in the housing, a rotary actuating unit mounted pivotally on the central processing unit, and a spring unit which biases the insertion elements to extend from the housing to engage within the locking holes of the storage chamber so as to retain the hard disk drive unit in the storage chamber. When the rotary actuating unit is turned upward, the insertion elements retract into the housing, thereby enabling the hard disk drive unit to be removed from the central processing unit.

BRIEF DESCRIPTION OF THE DRAWING

Other features and advantages of this invention will become apparent in the following detailed description of the preferred embodiments of this invention, with reference to the accompanying drawings, in which:

FIG. 4 is an enlarged view showing the rotary actuating unit and the insertion elements of the hard disk drive unit of the portable computer according to the first embodiment of this invention;

FIGS. 5A and 5B are perspective views illustrating the mounting of the rotary actuating unit on the hard disk drive unit of the portable computer according to the first embodiment of this invention;

FIG. 10 is a partially exploded view showing the portable computer according to the second embodiment of this invention.

DETAILED DESCRIPTION OF THE PREFERRED EMBODIMENTS

Figure 1:
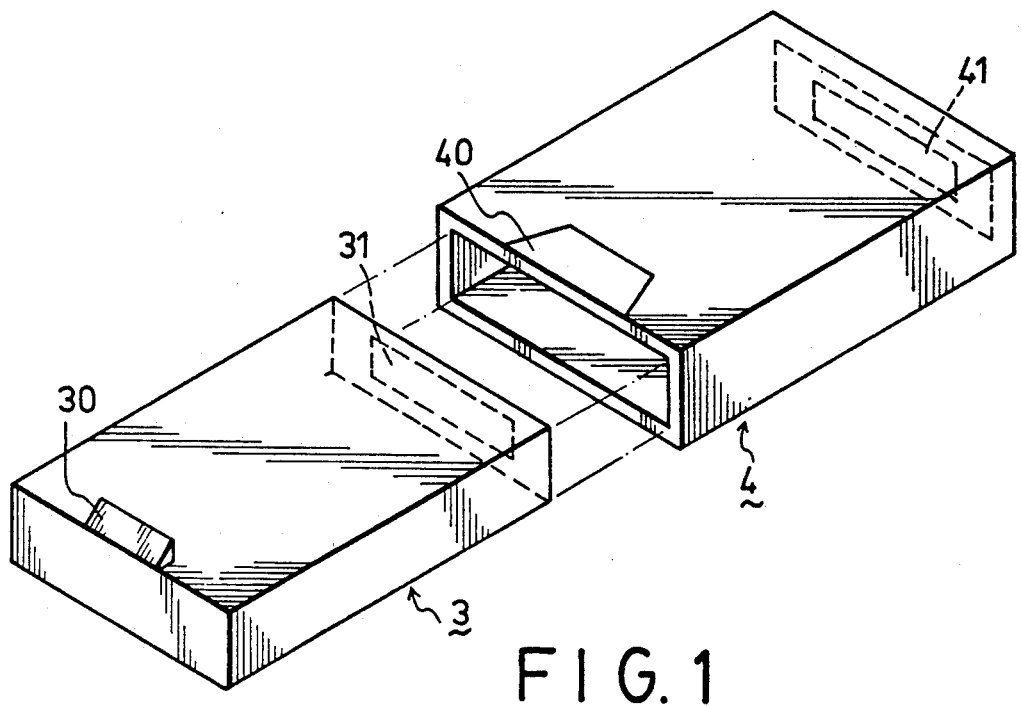
FIG. 1 is a partially exploded view of a conventional hard disk drive.
Figure 2:
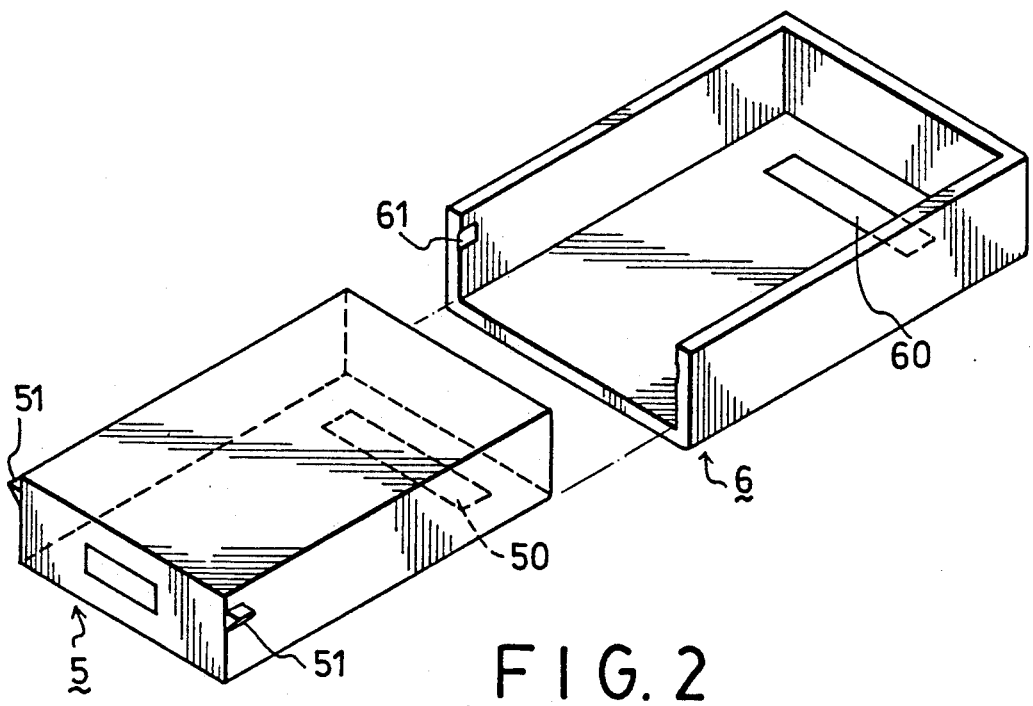
FIG. 2 is a partially exploded view of another conventional hard disk drive.
Figure 3:
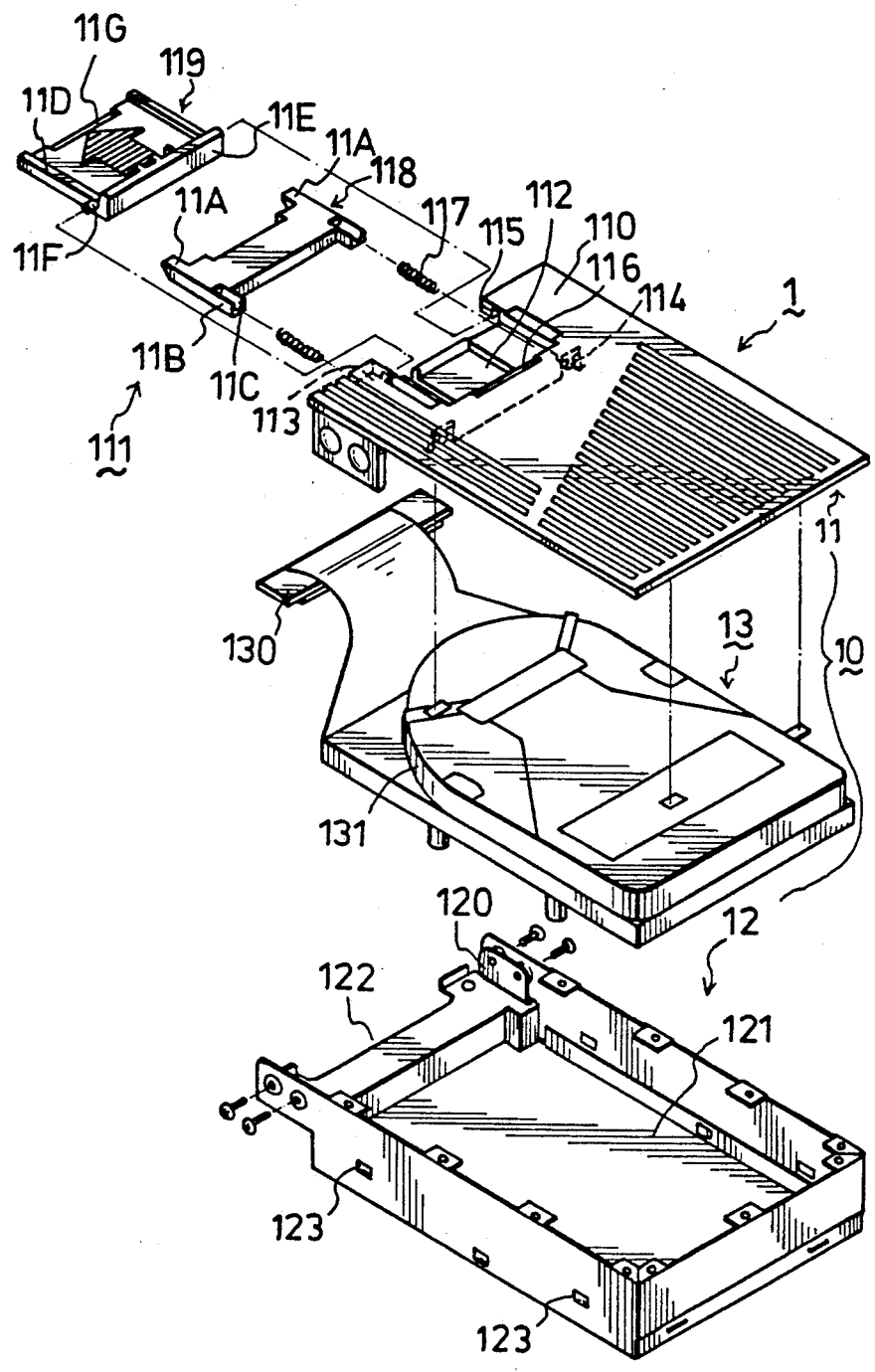
FIG. 3 is a partially exploded view showing the hard disk drive unit of a portable computer according to the first of this invention.

Referring to FIG. 3, the hard disk drive unit (1) of a portable computer includes a sealed housing (10) which consists of an upper housing (11) and a lower housing (12). A disk loading member (13) is mounted within the housing (10) and is provided with a connector (130) and a hard disk body (131). The lower housing (12) has a connecting portion (120) and an accommodating chamber (121) in which the disk loading member (13) is placed. The connecting portion (120) has a rectangular notch (122) within which the connector (130) is engaged so as to expose the connector (130) to the outside of the housing (10). The housing (10) has a driving device (not shown) mounted therein.

The upper housing (11) includes a cover plate (110) screwed to the lower housing (10), and a control mechanism (111) installed on the cover plate (110). As best shown in FIG. 4, the cover plate (110) has a recess (112), two slide slots (113) formed in the upper surface of the cover plate (110) on two sides of the recess (112), and two integral guide elements (114) extending downward from the top wall of the cover plate (110) into the slide slots (113). Two aligned pivot holes (115) are formed in the cover plate (110) on two sides of the recess (112) and are open at the lower ends thereof. An inclined groove (116) is formed in the upper surface of the cover plate (110) and is adjacent to the recess (112). The control mechanism (111) consists of a spring unit or two coiled compression springs (117), a generally H-shaped movable plate (118) and an L-shaped rotary actuating unit (119) which is generally shaped in the form of a rectangular plate. The movable plate (118) is disposed slidably in the recess (112) of the cover plate (110) and has two aligned integral insertion elements (11A) projecting from one side thereof, two integral protrusions (11B) projecting from the opposite side thereof and being aligned with the insertion elements (11A), and two guide slots (11C) formed in the upper surfaces of the protrusions (11B). The insertion elements (11A) and the protrusions (11B) are positioned in the slide slots (113) of the cover plate (110).

As best shown in FIGS. 4. 6A and 6B, the rotary actuating unit (119) is L-shape and has a long acutator plate (11D), a short push plate (11E) and two lugs (11F) extending from two opposite sides thereof to engage within the pivot holes (115) of the cover plate (110) so as to mount the rotary actuating unit (119) rotatably on the cover plate (110). The end of the cover plate (110) has an integral stop element (11H) projecting upward therefrom and associated with the engagement between the guide elements (114) and the guide slots (11C) so as to confine the movable plate (118) in the recess (112). Each of the coiled compression springs (117) is placed in the guide slot (11C) of the movable plate (118) between the guide element (114) and the movable plate (118) so as to push the insertion elements (11A) to extend from the end of the cover plate (110).

Figure 5C:
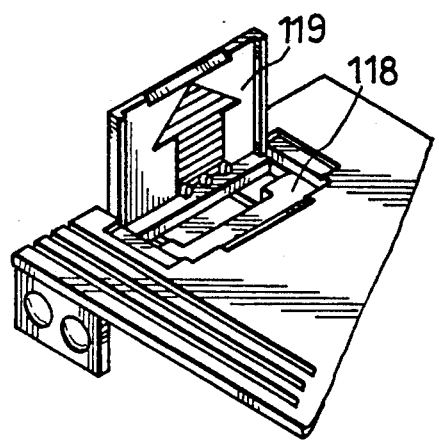
FIGS. 5C, 5D, 6A, and 6B are schematic views illustrating the position of the insertion elements relative to the rotary actuating unit when the rotary actuating unit is turned in accordance with the first embodiment of this invention.
Figure 5D:
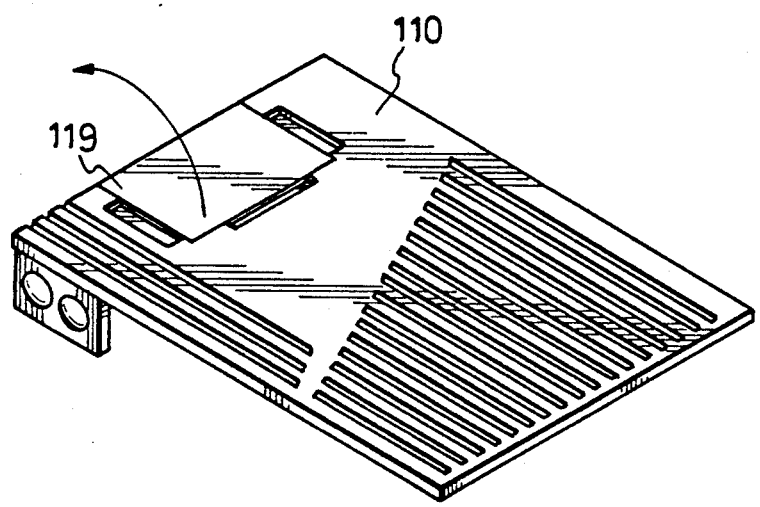

In assembly, the compression springs (117) are placed in the guide slots (11C) of the movable plate (118). The movable plate (118) is placed in the recess (112) of the cover plate (110) in such a manner that the guide elements (114) are engaged within the guide slots (11C). Then, the rotary actuating unit (119) is placed in the position shown in FIG. 5A and is moved to the position shown in FIG. 5B so that the lugs (11F) push the insertion elements (11A) inward until the outer ends of the insertion elements (11A) move beyond the pivot holes (115), thereby permitting the lugs (11F) to be moved upward into the pivot holes (115). When one desires to remove the rotary actuating unit (119) from the cover plate (110), the rotary actuating unit (119) is first turned to the position shown in FIG. 5B. Subsequently, the outer ends of the insertion elements (11A) are pushed inward by an elongated tool to move beyond the pivot holes (115) so as to enable the lugs (11F) to be removed from the pivot holes (115).

Figure 7:
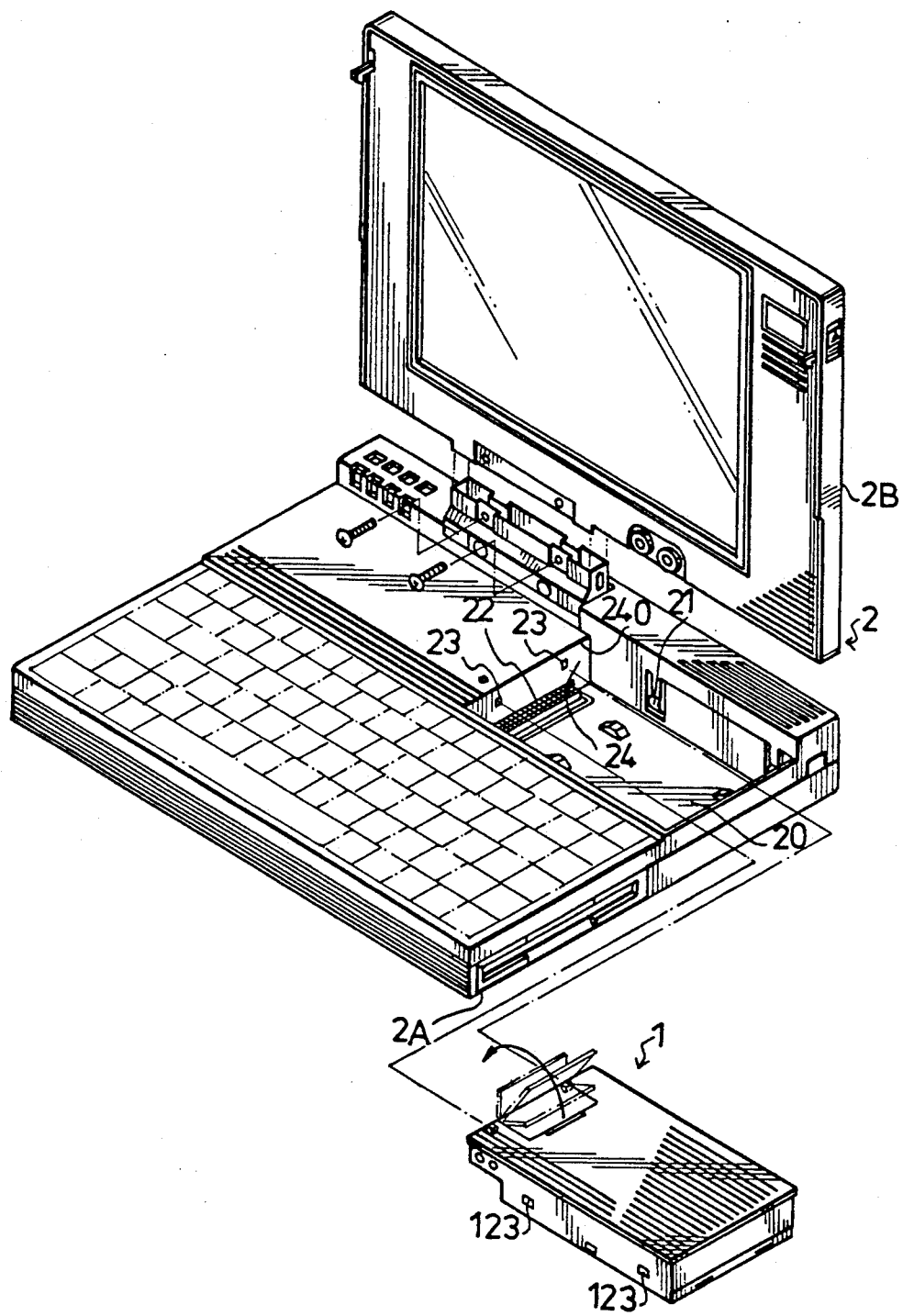
FIG. 7 is a partially exploded view of the portable computer according to the first embodiment of this invention.

Referring to FIG. 7, the portable computer of this invention has a main body (2) which consists of a central processing unit (2A) with a generally rectangular storage chamber (20), and a monitor unit (2B) pivoted to the central processing unit (2A). When the monitor unit (2B) is turned downward to lay on the central processing unit (2A), the former is locked automatically and releasably on the latter. The storage chamber (20) is defined by a bottom wall and a side wall assembly which consists of four side walls. The central processing unit (2A) includes four flexible spring sheets (21) disposed on two opposite side walls of the storage chamber (20), a connector (22) provided on the bottom wall of the storage chamber (20), and two aligned locking holes (23) formed in a side wall (24) of the storage chamber (20).

Figure 6A:
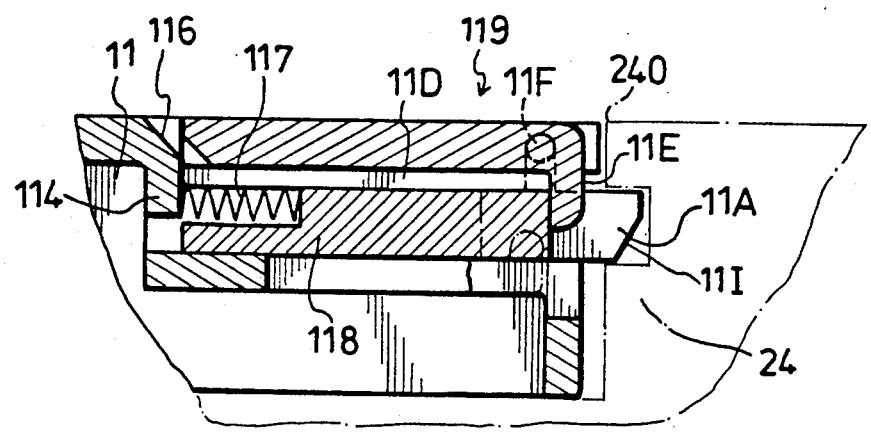

As illustrated, the storage chamber (20) of the central processing unit (2A) is sized so as to fit the hard disk drive unit (1) therein. The outer end of each of the insertion elements (11A) has an inclined surface (111) (see FIGS. 6A and 6B) at the lower portion thereof. Therefore, when the hard disk drive unit (1) is inserted into the storage chamber (20) in such a manner that the rotary actuating unit (119) lays on the housing (10) of the hard disk drive unit (1), the inclined surface (111) contacts the top end (240) of the side wall (24) and automatically retracts into the housing (10) of the hard disk drive unit (1). As soon as the connector (not shown) of the hard disk drive unit (1) engages the connector (22) of the central processing unit (2A), the springs (117) push the movable plate (118) to the position shown in FIG. 6A in which the insertion elements (11A) extend from the housing (10) to engage within the locking holes (23) of the central processing unit (2A) so as to retain the hard disk drive unit (1) within the storage chamber (20). At this time, the projections (123) of the housing (10) of the hard disk drive unit (1) come into contact with the flexible spring sheets (21) of the central processing unit (2A) so as to help lock the hard disk drive unit (1) within the storage chamber (20).

Figure 6B:
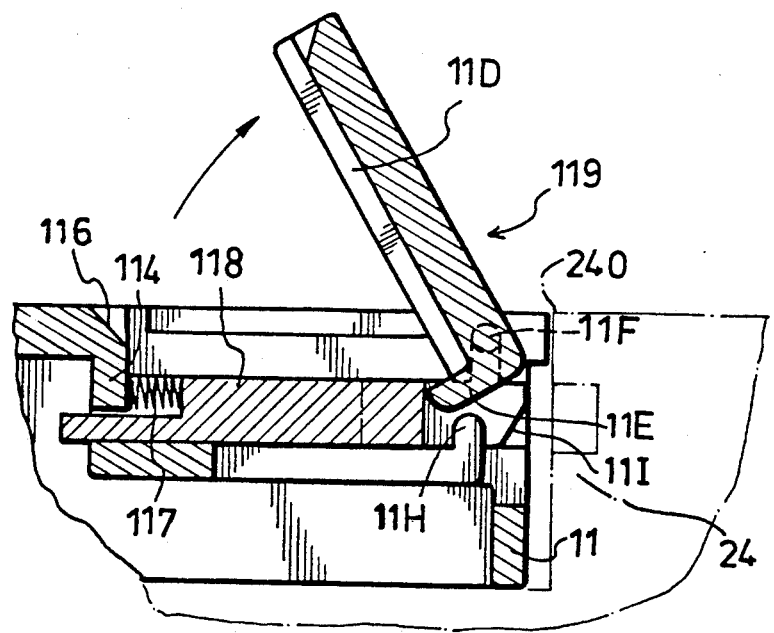

When it is desired to remove the hard disk drive unit (1) from the storage chamber (20), the nail on one finger of the operator extends into the inclined groove (116) and turns the rotary actuating unit (119) upward to the position shown in FIG. 6B so that the short push plate (11E) of the rotary actuating unit (119) pushes the insertion elements (11A) into the housing (10).

Figure 8:
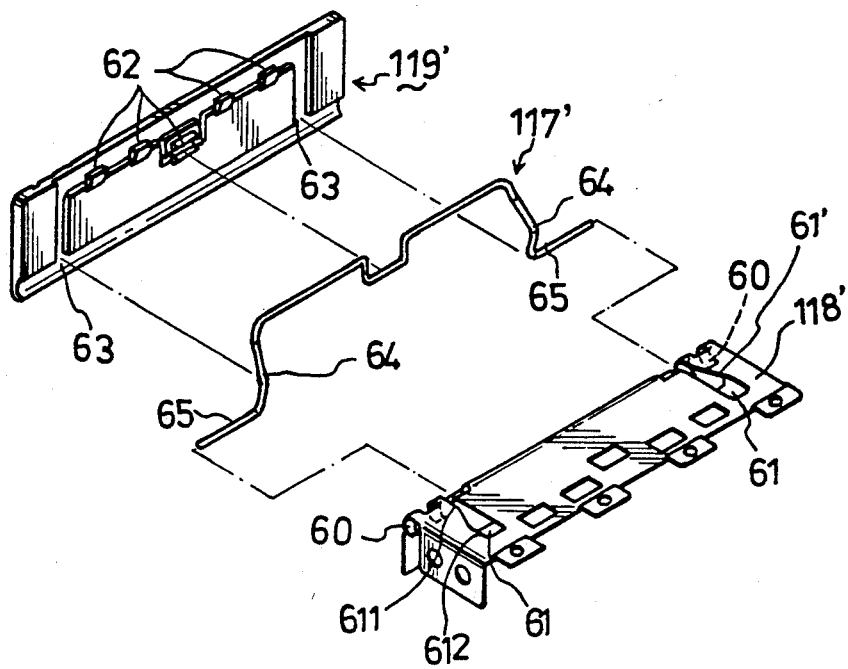
FIG. 8 is an exploded view showing a portion of the hard disk drive unit on a portable computer according to the second embodiment of this invention.
Figure 9:
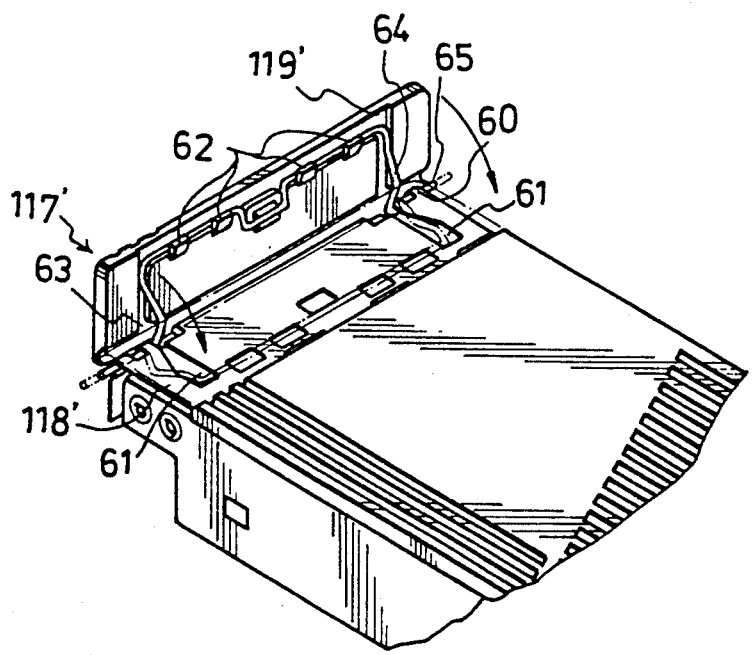
FIG. 9 is a schematic view illustrating how the insertion elements of the hard disk drive unit are moved in accordance with the second embodiment of this invention.

Alternatively, the control mechanism of the hard disk drive unit (1) may be modified, as shown in FIGS. 8 and 9, so as to include a flexible metal strip (117'), an elongated horizontal plate (118') fixed on the housing of the hard disk drive unit, and a rotary actuating unit (119') which is shaped in the form of a rectangular plate. The horizontal plate (118,) has two bend portions (60) at two end portions thereof, two notches (61) adjacent to the inner sides of the bend portions (60), and two curved cam surfaces (61) each of which has a convex portion (611) and a concave portion (612). The rotary actuating unit (119') includes four clamping elements (62) fixed on the upper portion thereof, and a slot (63) formed in the lower portion thereof. The flexible strip (117') has a middle portion retained on the clamping elements (62) of the rotary actuating unit (119'), two generally V-shaped connecting portions (64) respectively connected to the outer ends of the middle portion and acting as the springs (117) of the first embodiment, and two aligned horizontal end portions (65) respectively extending from the outer ends of the connecting portions (64) and acting as the insertion elements (11A) of the first embodiment. Because the horizontal end portions (65) of the flexible strip (117') are journalled on the bend portions (60) of the horizontal plate (118') in such a manner that the bend portions (60) are aligned with the slot (63) of the rotary actuating unit (119'), the rotary actuating unit (119') can rotate about the end portions (65) of the flexible strip (117').

Normally, the rotary actuating unit (119') is located in a horizontal position in which the V-shaped connecting portions (64) of the flexible strip (117') abuts against the concave portions (612) of the horizontal plate (118'). At this time, as illustrated in the phantom lines of FIG. 9, the horizontal end portions (65) extend from two ends of the horizontal plate (118') When the rotary actuating unit (119') is turned upward, the V-shaped connecting portions (64) of the flexible strip (117') slide over the curved cam surface (61') from the concave portions (612) to the convex portions (611). As a consequence, the V-shaped connecting portions (64) move toward each other so as to retract the outer ends of the horizontal end portions (65) into the bend portions (60) of the horizontal plate (118').

Referring to FIG. 10, in order to conform with the structure of the control mechanism shown in FIGS. 8 and 9, the rectangular storage chamber (20') of the central processing unit (2A') has two locking holes (23') which are respectively formed in two opposite side walls.

With this invention thus explained, it is apparent that numerous modifications and variations can be made without departing from the scope and spirit of this invention. It is therefore intended that this invention be limited only as indicated in the appended claims.

I CLAIM:

1. A portable computer including a central processing unit, a monitor unit laying on said central processing unit and being mounted pivotally on said central processing unit, and a hard disk drive unit mounted in said central processing unit, said monitor unit being locked releasably on said central processing unit, the improvement comprising: said central processing unit having a generally rectangular storage chamber formed in an upper surface thereof, said storage chamber having a bottom wall and a side wall assembly which includes four side walls, said side wall assembly having two locking holes formed therein, said hard disk drive unit including a sealed housing, a driving device disposed in said housing, two insertion elements mounted movably in said housing and extending from said housing to engage within said locking holes of said central processing unit so as to retain said hard disk drive unit within said storage chamber, a rotary actuating unit pivoted operatively to said housing and actuatable so as to move said insertion elements to retract into said housing, and a spring unit biasing said insertion elements to extend from said housing to engage within said locking holes of said central processing unit, whereby, in a case where said monitor unit is rotated away from said central processing unit, said rotary actuating unit can be rotated so as to retract said insertion elements into the housing, thereby enabling said hard disk drive unit to be removed from said central processing unit.

2. A portable computer as claimed in claim 1, wherein said locking holes are formed in one of said side walls which define said storage chamber, said hard disk drive unit including a movable plate to which said insertion elements are secured, said spring unit including two coiled compression springs mounted in said hard disk drive unit so as to push said movable plate outward toward said locking holes of said central processing unit, said rotary actuating unit laying on said housing and being L-shaped, said rotary actuating unit having an long actuator plate positioned above said movable plate and a short push plate abutting against outer end surfaces of said insertion elements, whereby, when said rotary actuating unit is turned upward, said short push plate of said rotary actuating unit pushes said movable plate inward to retract said insertion elements into said housing.

3. A portable computer as claimed in claim 2, wherein each of said insertion elements has an inclined surface at a lower portion of an outer end surface thereof, whereby, in a case where said insertion elements extend from said housing, when said hard disk drive unit is inserted into said storage chamber, said side wall assembly of said storage chamber pushes said insertion elements into said housing, thereby allowing insertion of said hard disk drive unit into said storage chamber.

4. A portable computer as claimed in claim 1, wherein said side wall assembly includes two opposite side walls in which said locking holes are respectively formed, said housing including a horizontal plate fixed on said housing, said horizontal plate having two curved cam surfaces each of which has a convex portion and a concave portion, said hard disk drive unit including a flexible strip interposed between said rotary actuating unit and said housing, said flexible strip having a middle portion fastened to said rotary actuating unit, two horizontal end portions extending from two opposite sides of said housing and constituting said insertion elements, and two generally V-shaped connecting portions each connected securely to one of said horizontal end portions and to an end of said middle portion, said horizontal end portions of said flexible strip being journalled on said housing so that said rotary actuating unit can rotate about said horizontal end portions of said flexible strip, said generally V-shaped connecting portions respectively abutting against said concave portions of said horizontal plate and being slidable along said curved cam surfaces of said horizontal plate when said rotary actuating unit is rotated, said rotary actuating unit laying on said housing, whereby, when said rotary actuating unit is turned upward, said generally V-shaped connecting portions of said flexible strip slide over said curved surfaces of said horizontal plate to abut against said convex portions of said horizontal plate so as to push said horizontal end portions of said flexible strip into said housing; when said generally V-shaped connecting portions of said flexible strip move from said convex portions to said concave portions of said curved cam surfaces, said horizontal end portions of said flexible strip extend from said housing by a restoration force thereof.

* * * * *